United States Patent Office 3,407,033
Patented Oct. 22, 1968

3,407,033
METHOD OF TREATING TITANIUM ORES WITH HYDROCHLORIC ACID TO PRODUCE TITANIUM TETRACHLORIDE THEREFROM
Hermann Rüter and Manfred Haerter, Ludwigshafen (Rhine), Egon Cherdron, Limburgerhof, Pfalz, and Eugen Scheuermann, Hassloch, Pfalz, Germany, assignors to Gebruder Giulini G.m.b.H., Ludwigshafen (Rhine), Germany
Filed Apr. 27, 1966, Ser. No. 545,658
Claims priority, application Germany, Jan. 21, 1966, G 45,783
12 Claims. (Cl. 23—87)

The present invention relates to a method for treating titanium ores.

More particularly, the present invention relates to the decomposition of titanium ores by means of hydrochloric acid. More particularly, the invention concerns a novel method for the decomposition of titanium ores wherein the ore is in the form of a loose bed or stream when subjected to the action of the hydrochloric acid.

The treatment of titanium ores with surfuric acid has long been known. Considerable quantities of by-product ferrous sulfate are formed thereby, which partly crystallizes as the heptahydrate and partly remains dissolved in the separated final liquors. The processing of the ferrous sulfate to sulfuric acid and iron oxide is expensive and results in increased operating costs. Thus, many attempts have been made to find other methods of disposal to avoid these drawbacks. Efforts have therefore also been made to utilize hydrochloric acid for ore decomposition, since the processing of the iron chloride by-product is much simpler and more economical.

In most of the known processes, the titanium mineral is treated with fairly concentrated hydrochloric acid and at slightly elevated temperatures, in order to avoid hydrolysis of the titanium tetrachloride formed, cf. British Patent No. 409,847; published German patent application No. 1,165,563; German Patent No. 1,170,385. At these temperatures, and working in the absence of pressure there are required treatment times ranging from many hours to several days. For this reason, none of the known methods has been employed industrially.

There are also known processes which are performed at higher temperatures, for example, above 90° C., utilizing stronger acids, but the time period required in these processes results in a pigment which is not useful owing to hydrolysis of all the titanium to an insoluble residue in the form of metatitanic acid. In order to obtain a valuable titanium dioxide pigment therefrom, a further treatment is necessary, and hence none of these processes has reached the industrial stage, cf. British Patent No. 409,847 and German Patent No. 507,151.

In other processes, wherein temperatures up to 80° C. are employed, and the treatment uses hydrochloric acid, there is added a large excess of treating acid, in order to retard hydrolysis and to shorten the treatment time (published German patent application No. 1,192,632). Nevertheless, the treatment time here also takes about 3 hours, and the high consumption of acid is costly. Another disadvantage is the low $TiO_2$ contents of the extract in these processes, resulting in no industrial applications thereof to date. The same is true of processes which include reaction accelerators, such as fluorides, since the presence of these materials is undesirable in titanium dioxide pigments, cf. U.S. Patent No. 2,576,483.

Finally, there is known a process, described in German Patent No. 1,083,244, which employs temperatures above 90° C. for the decomposition of titanium ores with hydrochloric acid having a concentration of 32% by weight, wherein the titanium remains in solution as the tetrachloride. Herein the reaction velocity is promoted by a high mixing intensity, and hydrolysis is retarded by the addition of phosphorus pentoxide, phosphoric acid, or their salts.

Under the conditions described in German Patent No. 1,083,244, the employment of small additions of reagent, for example, with 1 kg. of ilmenite ore in only 10 minutes, there is attained a degree of attack of 95%, based on the $TiO_2$ content of the ore. With larger dosages of reagent up to 2 hours may be required, because of the long filling, heating, and discharge time periods, for attack. The reason is that, while ore and HCl are charged into the reaction vessel in cold state, it is only there that they are brought to the required reaction temperature. A preheating of the reactants is not possible in this mode of operation, because in the stationary reaction vessel the strongly exothermic decomposition reaction leads to a combining of the ore and HCl immediately upon their introduction and to local overheating in the reaction mixture. The result is an immediate hydrolytic decomposition of the primarily formed titanium tetrachloride in the reaction solution and a partial evaporation of the HCl from the not yet pressure-tightly sealed reaction vessel.

Moreover, the removal of the heat of reaction causes great difficulties particularly with regard to reaction vessels fitted with overhead rotating means. Moreover, at the temperatures employed and the required treatment times, hydrolytic decomposition of the titanium tetrachloride begins, so that the addition of phosphorus pentoxide, phosphoric acid or their salts is necessary. The presence of these hydrolysis-retardants in the decomposition solution is, however, undesirable, since they cause difficulties in the manufacture of the titanium dioxide pigment.

A primary object of the present invention is the provision of a method which makes it possible to carry out the decomposition of titanium ores by means of hydrochloric acid at elevated temperature and pressure without the addition of hydrolysis-retardants, and in such manner that the decomposition is terminated before any hydrolytic decomposition of the titanium tetrachloride formed takes place.

In accordance with the present invention, there is provided a novel method for the decomposition of titanium ore, such as ilmenites, with hydrochloric acid having a concentration above about 32% HCl by weight, under pressure, and at elevated temperature above the boiling point of the hydrochloric acid, comprising the steps of providing a loosely constituted body of titanium ore in a reaction zone, in the form of a loosely piled bed and/or a gently trickling stream of ore, above and descending through trays provided with openings, introducing streams of hot hydrochloric acid to continuously or intermittently penetrate said body of ore, said hydrochloric acid being under pressure, to attain a predetermined decomposition temperature of the ore, at least about 70° C., and preferably between about 70° and 90° C., and further introducing cold hydrochloric acid at a temperature between about 20° and about 60° C., into the reaction zone at a stream velocity of said cold hydrochloric acid sufficient to cool said zone and to compensate for the heat of the reaction and to maintain the decomposition reaction temperature of the ore within the range of about 70° to 100° C.

The hydrochloric acid is advantageously preheated to 70° to 90° C., so that the decomposition is performed within the range 70° to 100° C. This preheating may be performed outside the reaction vessel, to any desired starting temperature, for the decomposition.

The titanium ore may be supplied to the decomposition reaction in granular, unground form. The ore decomposition may be performed in continuous counter current manner, the ore being supplied from above, or from the side, and the preheated hydrochloric acid being introduced from below.

The ore decomposition may be carried out in any suitable type of apparatus, and preferably in a vessel provided with a tapering conical bottom.

As mentioned previously, the hydrochloric acid introduced for cooling purposes has a temperature between about 20° and 60° C. depending upon the amount of heat to be compensated for. It is brought up to the reaction temperature by the heat of the reaction.

Advantageously, the free cross-sectional area of the openings in the trays provided for access of hydrochloric acid and ore, diminishes in descending order of the trays.

The method of the invention may be performed in a series of several successively arranged reaction vessels of the character described.

The preheated hydrochloric acid may be recycled to any given decomposition solution. Thus, the method of the invention is adapted to continuous or to batch operation for decomposing titanium ores. In each case the decomposition can be performed in such manner that even after a single passage of the hydrochloric acid through the reaction vessel, the decomposition can be stopped, and it is found that so much titanium has dissolved in the extraction acid that the molar ratio of Ti to Cl attains more than 1:5. However, if desired, the decomposition acid can be wholly or partly recycled several times, until the desired degree of decomposition of the ore is achieved. This will be governed in individual cases by the size of the decomposition unit, and by the fact that several reaction vessels can be arranged in sequence.

For continuous extraction, the ore is advantageously introduced into the reaction vessel from above or sidewise, while the hydrochloric acid is introduced into the vessel from below in a stream countercurrent to the ore. To maintain the desired reaction temperature and for economical performance of the process, it is, as mentioned previously, advantageous to introduce a portion of the decomposition acid into the reaction vessel in cold condition. Thereby the liberated heat of reaction is used to heat this portion of the acid, and simultaneously an undue rise in reaction temperature is avoided.

Depending upon the required molar relationship, the average residence time of the hydrochloric acid introduced in the reaction vessel is about 10 to 20 minutes, and in this period of time the required concentration of titanium in the decomposition acid is attained. Using the measures previously described, it is possible to perform the decomposition of the ore industrially in from 10 to 20 minutes.

In one embodiment of the invention, the titanium ore pile is advantageously produced in a reaction zone or vessel provided with a tapering conical bottom, and the hydrochloric acid is streamed through the ore bed from below to above. In this way a favorable set of stream conditions is produced, and the formation of ore clusters, which readily lead to local heating, is avoided.

In a second embodiment of the invention, the ore trickles or gently descends in a stream from above onto the trays provided with openings, in a preferably cylindrical vessel, in which the ore contacts the hydrochloric acid. In this case it is of advantage to make the openings in the trays progressively smaller going from top to bottom, so that the stream velocity of the hydrochloric acid increases as it moves from the bottom to the top of the vessel. It is also advantageous to combine both these embodiments, so that the reaction vessel comprises a single unit in which the conical portion is disposed beneath the cylindrical portion.

In accordance with the invention, it is possible to decompose titanium ores in such a short time with concentrated hydrochloric acid at elevated temperature and pressure, that no hydrolytic decomposition of the dissolved titanium tetrachloride takes place, and this is achieved without the use of accelerators of stabilizing additives. A further advantage of the method of the invention is that there can also be prepared so-called basic decomposition solutions, i.e. solutions in which the molar ratio of Cl to Ti is smaller than 4:1. The saving of decomposition acid thus achieved, naturally reduces the costs of the titanium dioxide pigment. A further economic advantage afforded by the method of the invention is that the ores can also be processed in granular, unground form, eliminating the previous customary fine grinding. In continuous operation, the elimination of previously required charging, discharging and heating periods, the overall short treatment time now needed, necessitates only very small units, thus greatly reducing investment costs.

In the method of the invention, the net consumption of hydrochloric acid is extremely small, since the acid can be recovered by any of the well known recovery processes from the mother liquor and from the precipitated iron chloride in a profitable manner.

The method of the invention is applicable to any titanium ores which are capable of being decomposed by hydrochloric acid, but it is especially adapted for the treatment of high-analysis titanium-rich ores such as ilmenite $FeTiO_3$, and sphene or titanite (calcium titanate).

As mentioned previously, the decomposition with hydrochloric acid in accordance with the invention, is carried out under pressure. When employing preheated hydrochloric acid for the ore decomposition, the pressure immediately upon introduction of the acid into the reaction vessel reaches about 6 atmospheres, thereafter falling into the general range of about 0.5 to about 0.8 atmosphere, depending upon the temperature. This mode of operation is illustrated in Examples 1, 2 and 4 below. However, when employing multiple reaction vessels, as described in Example 3 below, the initial pressure is about 6 atmospheres, but after the decomposition reaction gets under way, the reaction vessels continue to be under a pressure of about 5 atmospheres, which is only slightly diminished by the decomposition reaction, since during the entire decomposition process, hydrochloric acid is continuously supplied in the form of a stream through the decomposition or reaction vessels from the preheating vessel.

Additional objects and advantages of the present invention will become apparent upon consideration of the following description when taken in conjunction with the accompanying drawings in which.

Figure 1:
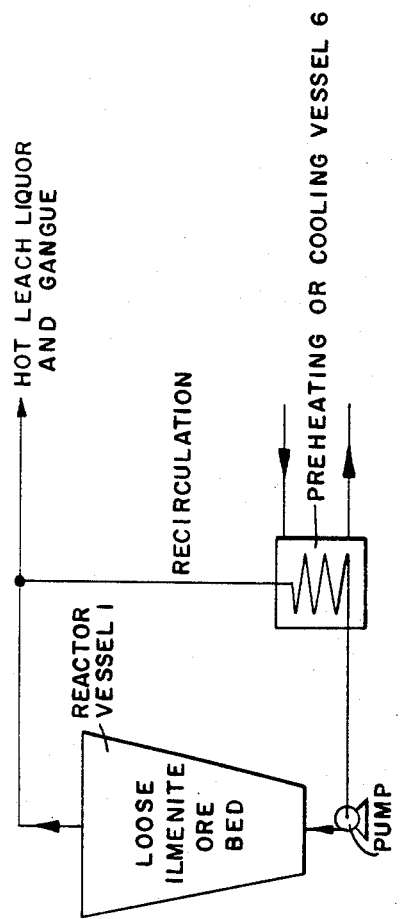
FIGURE 1 shows a schematic arrangement of a reactor vessel for maintaining a loose bed of ore to be decomposed, and means for circulating hydrochloric acid thereto.

Referring now to the drawings, and first to FIGURE 1 thereof, the same shows a reactor vessel 1 containing the loose ilmenite ore bed, the top of the reactor putting out the hot leach liquor and gangue, there being a recirculation branch, incorporating a pump in which the material is preheated or cooled.

Figure 6:
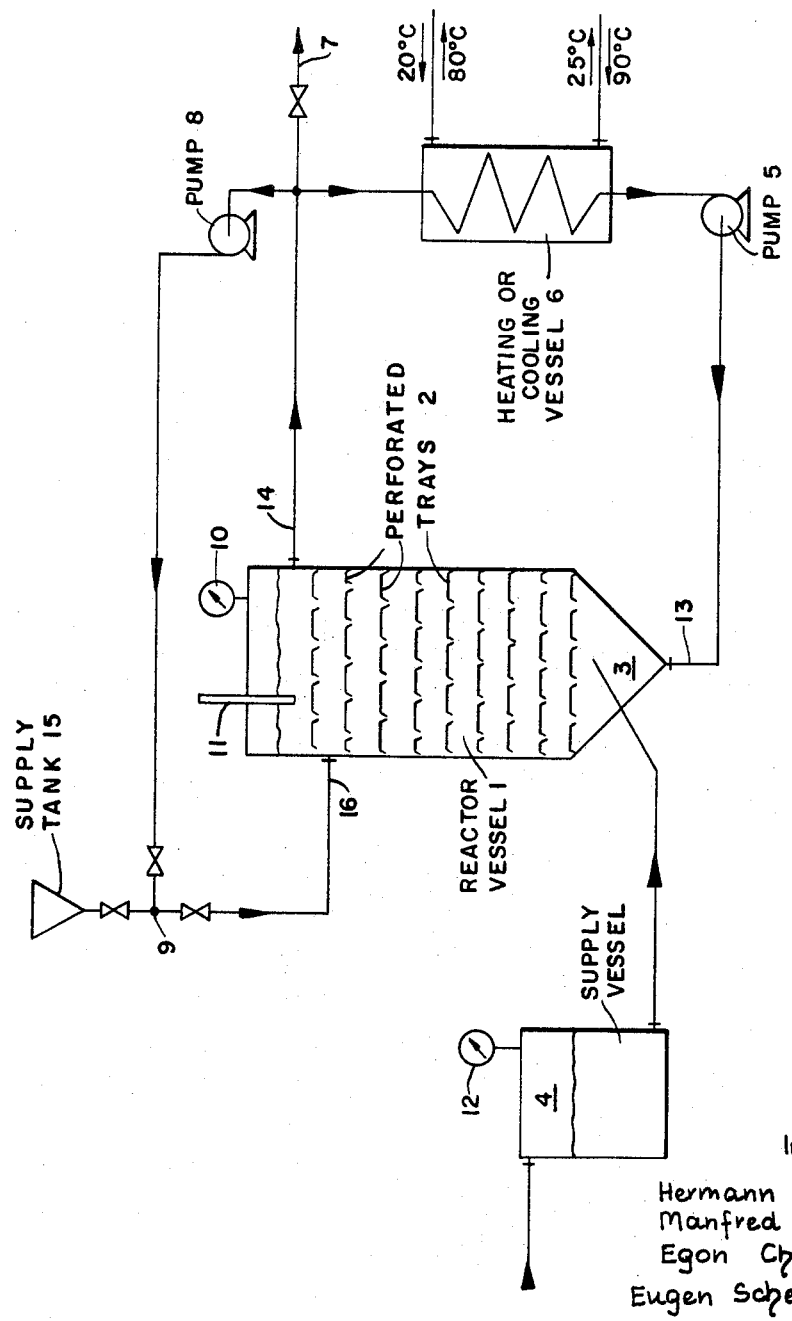
FIGURE 6 illustrates a further embodiment of apparatus employing a multi-tray reactor vessel.

A practical embodiment is shown in FIGURE 6, in which the reactor vessel 1 is shown as being provided with a multiplicity of perforated trays 2, and in which the free cross section of the openings for passage of ore and HCl becomes progressively smaller going from top to bottom. The reactor has a tapering conical bottom portion 3, provided with an inlet 13 for preheated HCl, which is supplied thereto by pump 5. The hydrochloric acid is preheated in a heating vessel 6 and enters vessel 1 via portion 3. Exit conduit 14 is provided for removal of hydrochloric acid or decomposition solution from reactor 1, for partial removal from the system via line 7, and for partial recirculation into heating vessel 6, which can now also serve as a cooler, thence returning the acid to the reactor via pump 5 and inlet 13.

A further portion of the removed acid is transferred via pump 8 into a metering apparatus 9, and enters reactor 1 at inlet 16 together with ilmenite metered in from supply tank 15, inlet 16 being located at a point below the first or topmost perforated tray.

During the operation, cold hydrochloric acid is supplied to bottom portion 3 of the reactor from supply vessel 4, to compensate for the heat formed in the reaction. Pressure and temperature are measured in the reactor by gauge 10 and thermometer 11 respectively, as is also the pressure in vessel 4 by gauge 12. The hot hydrochloric acid or decomposition solution has its stream velocity so regulated that the desired degree of decomposition of the ore as indicated by decomposition solution removed at 7 is achieved by one or several circulation sequences via elements 6, 5, 13, 3, 1 and 14 as indicated.

Figure 2:
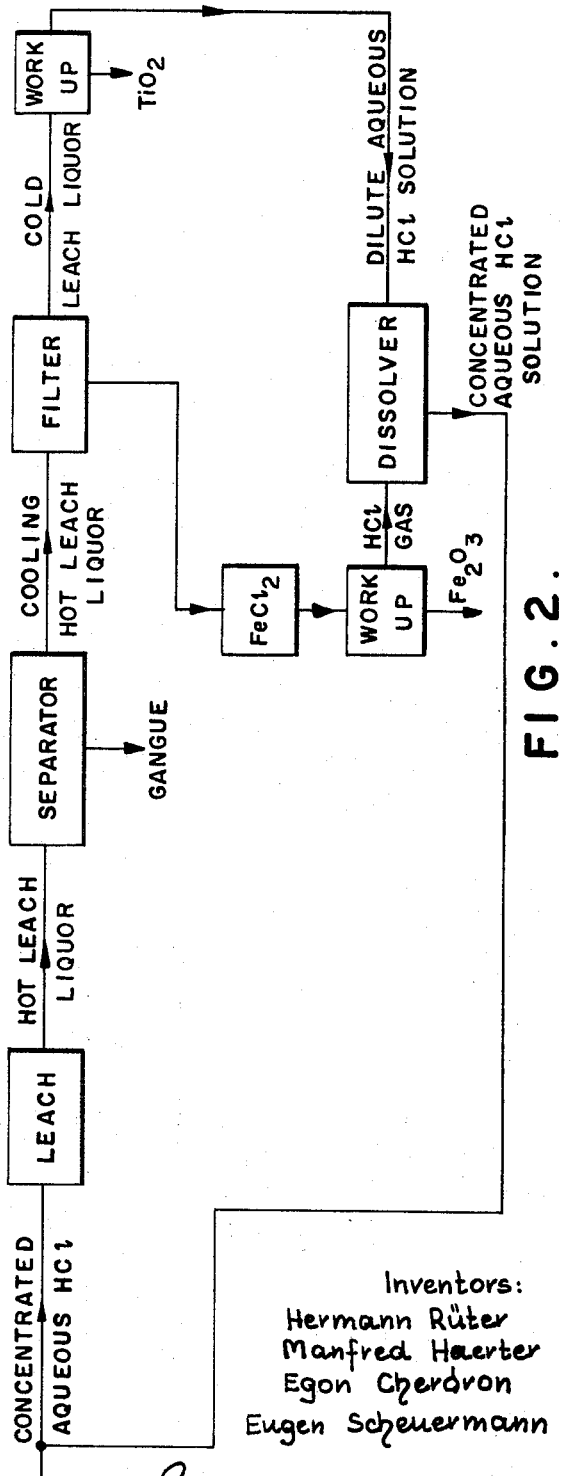
FIGURE 2 is a flow sheet of a titanium ore treatment sequence in accordance with the method of the invention.
Figure 3:
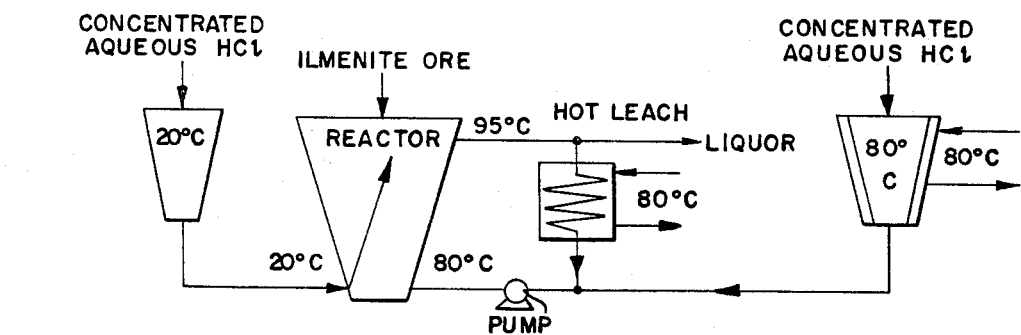
FIGURE 3 represents a schematic arrangement of apparatus and temperature conditions in accordance with Example 2.
Figure 4:
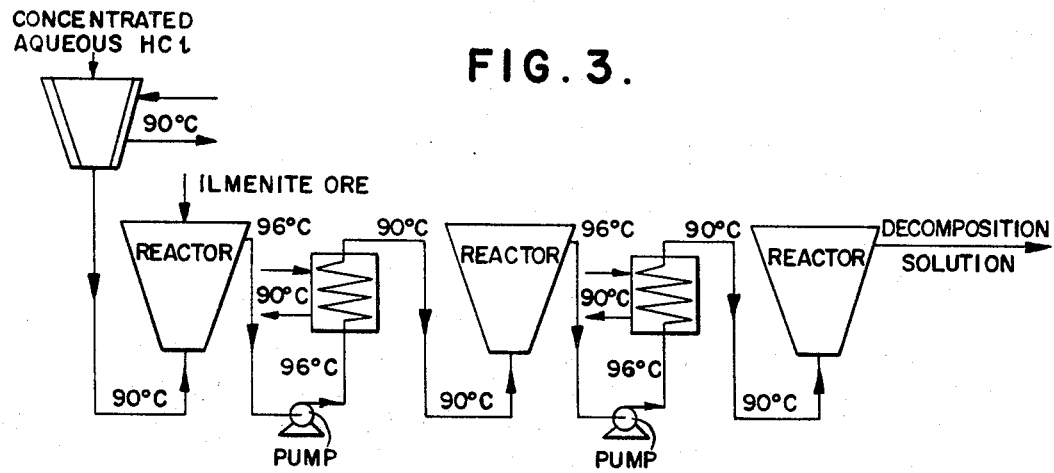
FIGURE 4 represents a schematic arrangements of the three-stage apparatus and set of conditions described in Example 3.
Figure 5:
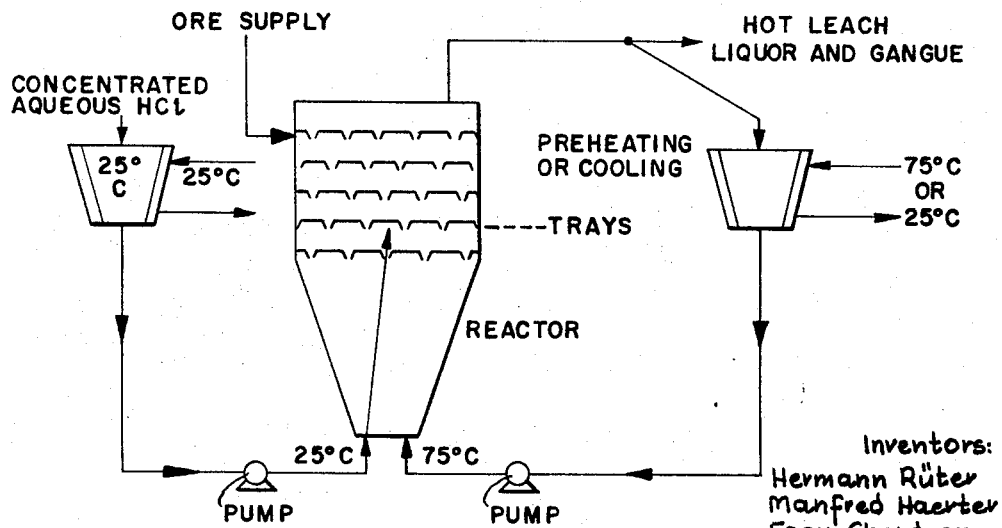
FIGURE 5 shows a reactor vessel and associated apparatus and operating conditions as described in Example 4.

FIGURE 2, as described above, shows the flow of a titanium ore treatment sequence in accordance with the method according to the present invention.

The following examples illustrate the practice of the invention, but are not to be regarded as limiting:

Example 1

200 g. of unground ilmenite having an analysis: $TiO_2$ 48.8%, $Fe_2O_3$ 11.15%, FeO 39.05%, and $SiO_2$ 0.82%, were charged into a pressure vessel having a conical tapering bottom, of about 5 liters capacity, together with 5 liters of hydrochloric acid of 38% concentration by weight, and a sp. gr. 1.192. The upper portion of the vessel was provided with an opening through which the HCl was introduced by means of a pump and circulated across a heating or cooling apparatus back into the vessel. Heating was started and the HCl heated to about 70° C. On pumping, the acid flows through the loose titanium ore and back into the vessel. The stream velocity is so adjusted that the hydrochloric acid circulates through the reaction 2 to 3 times per minute. After commencement of the decomposition reaction, the temperature in the reaction vessel is adjusted to 93.5° C. by cooling of the circulating decomposition solution. The starting pressure is about 2.5 atmospheres, but after the reaction is under way, this drops to 0.5 atmosphere.

After about 15 minutes, a molar ratio of Cl to Ti of 4.5:1 is attained. The degree of decomposition can, after another 20 minutes, be brought to a molar ratio of Cl to Ti of 3.97:1.

The hot decomposition solution, which also contains a light, finely divided gangue, after the decomposition is ended, is reduced in known manner, to a titanium$^{III}$ content of 3 to 5 g. per liter. Thereby all the iron is converted to Fe$^{II}$. The solution is then cooled with stirring and thereby ferrous chloride tetrahydrate is precipitated, together with the gangue. The filtered decomposition solution now contains 166.4 g. $TiO_2$ per liter and 69.2 g. $Fe_2O_3$ per liter. It is processed into titanium dioxide pigment, and the hydrochloric acid recovered from the final hydrolysis solution is fortified with HCl gas and recycled to a fresh decomposition operation.

The 1420 g. ferrous chloride formed as a by-product were decomposed into iron oxide and HCl in a suitable decomposition apparatus.

Example 2

3000 g. ilmenite having an analysis: $TiO_2$ 44.5%, $Fe_2O_3$ 12.45%, FeO 34.0%, MgO 5.5%, $As_2O_3$ 0.53% and $SiO_2$ 0.25% were charged into a 5 liter pressure vessel provided with a conical tapering bottom, and this was closed so as to be pressure-tight. Into a second pressure vessel connected via a pipe with the bottom of the first vessel, there were in the meantime preheated 5 liters of concentrated 38% hydrochloric acid, sp. gr. 1.192, to a temperature of 80° C. After attaining this temperature, the preheated HCl, which was now at a pressure of about 6 atmospheres, was introduced into the decomposition vessel. Therein the hot HCl streams through the loose ore bed and leaves the vessel at its upper end. The acid then flows through a cooler and is recirculated to the decomposition vessel by a pump. The initial pressure in the reaction vessel is also 6 atmospheres, but drops rapidly to about 0.5 atmosphere.

During the decomposition there is introduced into the reaction zone from a separate pressure vessel about 300 ml. of hydrochloric acid at 20° C., having the same concentration mentioned above. At the same time, there are introduced into the reaction vessel every 2.5 minutes, 250 g. portions of ilmenite ore by means of a charging gate, the ore having the composition described above. The cold HCl compensates for the heat of reaction and is simultaneously heated to the required reaction temperature. Further cooling is not necessary under the tests conditions described.

The stream velocity is so regulated that in 1 minute, 5 liters of decomposition acid pass twice through the ore bed. After 15 minutes reaction equilibrium is achieved. The amounts of finished decomposition acid at the upper end, depending upon added HCl and ilmenite volumes, have molar ratio of Ti to Cl of 1:4.1. After separating the major portion of the iron salt at 20° C. the decomposition solution has an average titanium dioxide content of 140 g./l.

Further processing is carried out as in Example 1, but other known procedures can be employed as well.

Example 3

The decomposition vessels having conical tapered bottoms, each having the same capacity as mentioned in Example 1, were so arranged that the discharge of the first vessel was connected to the inlet of the next vessel. The three vessels were charged with a total of 9 kg. of ilmenite of a composition the same as that disclosed in Example 1, and the vessels were then sealed pressure tight. From a pressure reservoir, in which in the meantime about 60 liters of 38% hydrochloric acid of sp. gr. 1.192 had been preheated to 90° C., about 900 ml. of the preheated HCl were run successively through the three reaction vessels. In this way a definite amount of the mineral was decomposed in each vessel, and titanium as well as iron brought into solution. The temperature rose thereby from 90° C. to 96° C. in the decomposition acid, and before it was passed to the next reaction vessel, the temperature was lowered back to 90° C. by suitable cooling. The initial pressure was at first about 6 atmospheres, but after the decomposition reaction got under way, dropped to 5 atmospheres.

The decomposition acid leaves the third vessel through a valve, being separated from the decomposition system, and having a molar ratio of Ti to Cl of 1:1.46. After separation of the iron salts at 20° C., the average $TiO_2$ content is 135 g./l.

The further processing of the decomposition solution is carried out as described in Example 1.

In continuous performnace of the decomposition process, as described in Example 2, more ore and HCl are introduced into each vessel. In the foregoing case, there must be added per minute a total of 1 liter of HCl and 300 g. ilmenite. If the HCl is introduced cold into the reaction vessel, a further cooling of the decomposition solution is not necessary. Of the total amount of HCl and ore added, about 40–50% is charged to the first reaction vessel, 25–35% to the second, and 15–25% to the third.

Example 4

Into a cylindrical vessel, terminating at its lower end in a conical tapering portion, and provided in its interior with 5 trays about 50 mm. apart, said trays being provided with openings, there were charged 9 kg. of ilmenite of the same composition as in Example 2, and the vessel was sealed pressure tight. The openings in the trays for free passage of the ore and acid decrease in size from above to below. Into a second pressure vessel there were meanwhile preheated about 30 liters of 38% hydrochloric acid, sp. gr. 1.192, to a temperature of 75° C., and the acid was transferred by a pulsating pump through the loose ore bed located in the bottom conical portion and through the ore granules located above the perforated trays and trickling downward from them. After the decomposition acid has circulated through the decomposition tower to the extent of about 25 liters, the acid leaves the upper end of the tower and is recycled to the lower end of the tower by a pump. In order to remove heat of reaction formed, there were simultaneously introduced into the reaction zone 1.5 liters per minute of cold HCl at about 25° C. and of the same concentration sidewise and into the first upper third of the tower, between the first and second perforated trays, while every 2 minutes, 900 g. of ilmenite ore of the same composition were introduced through a gate.

The starting pressure was about 1.9 atmospheres, which adjusts after the reaction is under way to 0.8 atmosphere, while the temperature in the reaction vessel was about 95.5° C. At the upper end of the decomposition tower there is continuously removed an amount of finished decomposition solution corresponding to the quantity of ore and acid fed into the system. The finished solution has a molar ratio of Ti to Cl of 1:4.18, and after separation of the iron salts at 20° C. has a $TiO_2$ concentration of 137.7 g./l. and an iron oxide content of 93.5 g. $Fe_2O_3$ per liter.

The processing of the decomposition solution is performed similarly to that described in Example 1.

What is claimed is:

1. Method for the decomposition of titanium ores to produce titanium tetrachloride therefrom with hydrochloric acid having a concentration above about 32% by weight, under an initial pressure greater than atmospheric and at elevated temperature above the boiling point of the hydrochloric acid, comprising the steps of
   (a) providing a loosely constituted body of a titanium ore in a reaction zone, introducing streams of hot hydrochloric acid for penetrating said body of ore to attain a predetermined decomposition temperature of the ore at least about 70° C.; and
   (b) introducing cold hydrochloric acid at a temperature between about 20° C., and about 60° C., into said reaction zone at a stream velocity of said cold hydrochloric acid sufficient for cooling said zone thereby to compensate for the heat of reaction and to maintain the decomposition reaction temperature within the range of about 70° to about 100° C., whereby the titanium tetrachloride produced is dissolved and no hydrolytic decomposition of said titanium tetrachloride occurs.

2. The method of claim 1 in which the titanium ore is ilmenite.

3. The method of claim 1 in which the titanium ore is in granular, unground form.

4. The method of claim 1 in which the ore in the reaction zone is in the form of a loosely piled bed.

5. The method of claim 1 in which the ore in the reaction zone is in the form of a gently trickling stream above and descending through trays provided with openings.

6. The method of claim 1 in which the reaction zone has a tapering conical bottom.

7. The method of claim 1 in which the hydrochloric acid is preheated to at least 70° C., outside the reaction zone.

8. The method of claim 5 in which the free cross-sectional area of the openings in the trays diminishes in descending order of the trays.

9. The method of claim 1 in which the decomposition of the ore is performed in a series of successively arranged reaction zones.

10. The method of claim 1 in which the decomposition of the ore is performed continuously, the ore being introduced into the reaction zone from above and sidewise, and the hydrochloric acid being introduced into the reaction zone from below and counter-current to the direction of flow of ore.

11. The method of claim 1 in which the heated hydrochloric acid is at least partially recycled to the reaction zone.

12. The method of claim 1 in which the reaction solution is further treated to recover ferrous chloride and titanium dioxide therefrom.

References Cited

UNITED STATES PATENTS

| | | | |
|---|---|---|---|
| 2,804,375 | 8/1957 | Kamlet | 23—202 |
| 2,875,039 | 2/1959 | Bachmann | 23—87 XR |
| 2,963,360 | 12/1960 | Cobel et al. | 23—87 XR |
| 3,060,002 | 10/1962 | Leddy et al. | 23—87 XR |
| 3,236,596 | 2/1966 | Zirngibl et al. | 23—202 |

EARL C. THOMAS, *Primary Examiner.*

EDWARD STERN, *Assistant Examiner.*